US012750349B2

(12) United States Patent
Zhang et al.

(10) Patent No.: US 12,750,349 B2
(45) Date of Patent: Sep. 29, 2026

(54) EDGE/CLOUD REVERSAL SECURITY CHECK

(71) Applicant: Lenovo Enterprise Solutions (Singapore) Pte. Ltd., Singapore (SG)

(72) Inventors: Caihong Zhang, Shanghai (CN); Ming Lei, Shanghai (CN); Alexandru Cozma, Bucharest (RO); Zheng Sun, Shanghai (CN)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 25 days.

(21) Appl. No.: 19/049,960

(22) Filed: Feb. 10, 2025

(65) Prior Publication Data

US 2025/0385894 A1 Dec. 18, 2025

Related U.S. Application Data

(63) Continuation of application No. PCT/CN2024/098945, filed on Jun. 13, 2024.

(51) Int. Cl.
*H04L 9/40* (2022.01)

(52) U.S. Cl.
CPC ...... *H04L 63/0435* (2013.01); *H04L 63/0236* (2013.01); *H04L 63/1416* (2013.01); *H04L 63/166* (2013.01)

(58) Field of Classification Search
CPC ............. H04L 63/0435; H04L 63/0236; H04L 63/1416; H04L 63/166
See application file for complete search history.

(56) References Cited

U.S. PATENT DOCUMENTS 11,909,575 B1 * 2/2024 Mehrotra .............. H04L 41/046
12,041,177 B2 * 7/2024 Guim Bernat ...... H04W 12/009
(Continued)

FOREIGN PATENT DOCUMENTS

WO 2021173046 A1 9/2021
WO 2022258175 A1 12/2022

OTHER PUBLICATIONS

PCT Application No. PCT/CN2024/098945 filed Jun. 13, 2024, International Search Report and Written Opinion of the International Searching Authority mailed Mar. 5, 2025.
(Continued)

*Primary Examiner* — Chau Le
(74) *Attorney, Agent, or Firm* — Kunzler Needham & Hilton; Bruce R. Needham

(57) ABSTRACT

A method for an edge system/cloud reverse security check includes establishing a secure connection between a BMC of an edge server and management software of a remote management server. The management software manages the edge server through the BMC. The method includes receiving a unique user identifier and a public key from the management software. The method includes transmitting, from the BMC to a safety check module located on the management server, a request for information and transmitting, over the secure connection, the same request for information to the management software. The method includes receiving a safety check response from the safety check module and a management software response from the management software, comparing the safety check response and the management software response, and sending an alert signaling a security breach at the management software in response to the safety check response differing from the management software response.

20 Claims, 5 Drawing Sheets

(56) References Cited

U.S. PATENT DOCUMENTS

| | | | | |
|---|---|---|---|---|
| 2010/0277866 | A1* | 11/2010 | Chen | G06F 21/86 361/679.57 |
| 2020/0092256 | A1* | 3/2020 | Hansen | H04L 41/28 |
| 2021/0021431 | A1* | 1/2021 | Guim Bernat | H04L 9/3239 |
| 2024/0015508 | A1* | 1/2024 | Yoon | H04W 12/041 |

OTHER PUBLICATIONS

Pardeike, "Force user to reauthenticate periodically", Sync Gateway Couchbase Forms, Apr. 6, 2020, pp. 1-2.

Russel Van Tuyl, "Offensive Security Guide to SSH Tunnels and Proxies", SpectorOps Team Members, Medium, Apr. 22, 2021, pp. 1-34.

* cited by examiner

EDGE/CLOUD REVERSAL SECURITY CHECK

FIELD

The subject matter disclosed herein relates to computer system security and more particularly relates to an edge system security check of management software operating on a cloud computing system.

BACKGROUND

Edge servers often include a baseboard management controller ("BMC") and are often managed through the BMC via a management server located off site, such as in a cloud service provider. In some cases, a hacker is able to access the management server, and is then able to access the edge server.

BRIEF SUMMARY

A method for an edge system/cloud reverse security check is disclosed. An apparatus and computer program product also perform the functions of the method. The method includes establishing a secure connection between a BMC of an edge server at an edge location and management software of a management server running on a cloud server. The management software manages the edge server through the BMC and the secure connection is bidirectional. The method includes receiving a unique user identifier ("UUID") of the management software and a public key from the management software. The public key corresponds to a private key at the management server. The method includes transmitting, from the BMC to a safety check module located on the management server, a request for information and transmitting, over the secure connection, the same request for information to the management software. The method includes receiving a safety check response from the safety check module and a management software response from the management software, comparing the safety check response and the management software response, and sending an alert signaling a security breach at the management software in response to the safety check response differing from the management software response.

An apparatus for an edge system/cloud reverse security check includes a processor in a BMC of an edge server at an edge location and non-transitory computer readable storage media storing code. The code is executable by the processor to perform operations that include establishing a secure connection between the BMC and management software of a management server running on a cloud server. The management software manages the edge server through the BMC. The secure connection is bidirectional. The operations include receiving a UUID of the management software and a public key from the management software. The public key corresponds to a private key at the management server. The operations include transmitting, from the BMC to a safety check module located on the management server, a request for information and transmitting, over the secure connection, the same request for information to the management software. The operations include receiving a safety check response from the safety check module and a management software response from the management software, comparing the safety check response and the management software response, and sending an alert signaling a security breach at the management software in response to the safety check response differing from the management software response.

A program product for an edge system/cloud reverse security check includes a non-transitory computer readable storage medium storing code. The code is configured to be executable by a processor to perform operations that include establishing a secure connection between a BMC of an edge server at an edge location and management software of a management server running on a cloud server. The management software manages the edge server through the BMC and the secure connection is bidirectional. The operations include receiving a UUID of the management software and a public key from the management software and the public key corresponds to a private key at the management server. The operations include transmitting, from the BMC to a safety check module located on the management server, a request for information and transmitting, over the secure connection, the same request for information to the management software. The operations include receiving a safety check response from the safety check module and a management software response from the management software, comparing the safety check response and the management software response, and sending an alert signaling a security breach at the management software in response to the safety check response differing from the management software response.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
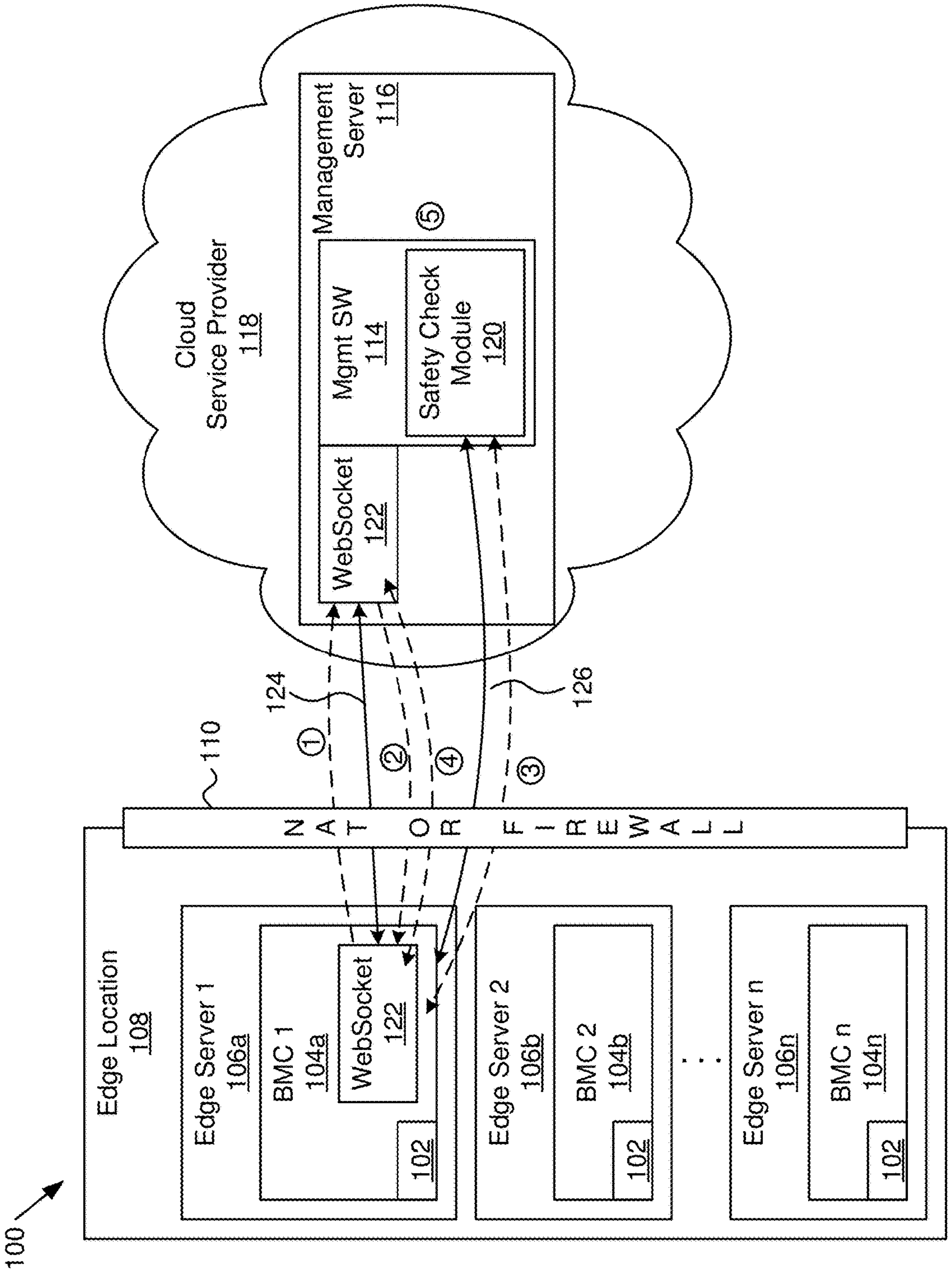
FIG. 1 is a schematic block diagram illustrating a system for an edge system/cloud reverse security check, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for an edge system/cloud reverse security check is disclosed. An apparatus and computer program product also perform the functions of the method. The method includes establishing a secure connection between a BMC of an edge server at an edge location and management software of a management server running on a cloud server. The management software manages the edge server through the BMC and the secure connection is bidirectional. The method includes receiving a unique user identifier ("UUID") of the management software and a public key from the management software. The public key corresponds to a private key at the management server. The method includes transmitting, from the BMC to a safety check module located on the management server, a request for information and transmitting, over the secure connection, the same request for information to the management software. The method includes receiving a safety check response from the safety check module and a management software response from the management software, comparing the safety check response and the management software response, and sending an alert signaling a security breach at the management software in response to the safety check response differing from the management software response.

In some embodiments, the management software encrypts the management software response using a private key corresponding to the public key and the method includes sending an alert in response to one of the BMC being unable to decrypt the management software response using the public key and the BMC not receiving a management software response within a time limit. In other embodiments, the request for information is one of a pool of requests for information, and the method includes randomly selecting a request for information from the pool of requests for information. In other embodiments, each request for information in the pool of requests for information includes a unique response known to the safety check module and to the management software. In other embodiments, the BMC periodically selects a request for information from the pool of requests for information and transmits the selected request for information to the safety check module and to the management software.

In some embodiments, transmitting the request for information to the safety check module is over an alternate connection separate from the secure connection and the BMC receives the safety check response over the alternate connection. In other embodiments, the BMC communicates over the alternate connection with the safety check module by encrypting the UUID and transmitting the encrypted UUID as a passcode along with the request for information to the safety check module. The safety check module decrypts the UUID using a private key corresponding to the public key, and/or the safety check module encrypts the safety check response using the private key prior to transmitting the safety check response to the BMC. The BMC uses the public key to decrypt the safety check response. The alternate connection expires in response to the safety check module transmitting the safety check response.

In some embodiments, the secure connection uses one of a WebSocket protocol, a Server-Sent Events ("SSE") protocol, a Long Poling protocol, a Message Queueing Telemetry Transport ("MQTT") protocol, a Web Real-Time Communication ("WebRTC") protocol, a WebTransport protocol, and a transmission control protocol ("TCP"). In other embodiments, communication between the management server and the BMC is across one of a firewall and a network address translation ("NAT") service, and/or the request for information includes an application programming interface ("API") call.

An apparatus for an edge system/cloud reverse security check includes a processor in a BMC of an edge server at an edge location and non-transitory computer readable storage media storing code. The code is executable by the processor to perform operations that include establishing a secure connection between the BMC and management software of a management server running on a cloud server. The management software manages the edge server through the BMC. The secure connection is bidirectional. The operations include receiving a UUID of the management software and a public key from the management software. The public key corresponds to a private key at the management server. The operations include transmitting, from the BMC to a safety check module located on the management server, a request for information and transmitting, over the secure connection, the same request for information to the management software. The operations include receiving a safety check response from the safety check module and a management software response from the management software, comparing the safety check response and the management software response, and sending an alert signaling a security breach at the management software in response to the safety check response differing from the management software response.

In some embodiments, the management software encrypts the management software response using a private key corresponding to the public key and the operations include sending an alert in response to one of the BMC being unable to decrypt the management software response using the public key and the BMC not receiving a management software response within a time limit. In other embodiments, the request for information is one of a pool of requests for information, and the operations include randomly selecting a request for information from the pool of requests for information. In other embodiments, each request for information in the pool of requests for information includes a unique response known to the safety check module and to the management software. In other embodiments, the BMC periodically selects a request for information from the pool of requests for information and transmits the selected request for information to the safety check module and to the management software.

In some embodiments, transmitting the request for information to the safety check module is over an alternate connection separate from the secure connection and the BMC receives the safety check response over the alternate connection. In other embodiments, the BMC communicates over the alternate connection with the safety check module by encrypting the UUID and transmitting the encrypted UUID as a passcode to the safety check module. The safety check module decrypts the UUID using a private key corresponding to the public key, and the safety check module encrypts the safety check response using the private key prior to transmitting the safety check response to the BMC. The BMC uses the public key to decrypt the safety check response. In other embodiments, the alternate connection expires in response to the safety check module transmitting the safety check response.

In some embodiments, the secure connection uses one of a WebSocket protocol, a SSE protocol, a Long Poling protocol, a MQTT protocol, a WebRTC protocol, a WebTransport protocol, and a transmission control protocol ("TCP"). In other embodiments, communication between the management server and the BMC is across one of a firewall and a NAT service. In other embodiments, the request for information includes an API call.

A program product for an edge system/cloud reverse security check includes a non-transitory computer readable storage medium storing code. The code is configured to be executable by a processor to perform operations that include establishing a secure connection between a BMC of an edge server at an edge location and management software of a management server running on a cloud server. The management software manages the edge server through the BMC and the secure connection is bidirectional. The operations include receiving a UUID of the management software and a public key from the management software and the public key corresponds to a private key at the management server. The operations include transmitting, from the BMC to a safety check module located on the management server, a request for information and transmitting, over the secure connection, the same request for information to the management software. The operations include receiving a safety check response from the safety check module and a management software response from the management software, comparing the safety check response and the management software response, and sending an alert signaling a security breach at the management software in response to the safety check response differing from the management software response.

FIG. 1 is a schematic block diagram illustrating a system 100 for an edge system/cloud reverse security check, according to various embodiments. The system 100 includes a safety check apparatus 102 in each baseboard management controller ("BMC") 104*a*-104*n* (generically or collectively "104") of edge servers 106*a*-106*n* (generically or collectively "106") at an edge location 108 that includes a firewall or network address translation ("NAT") service 110, management software 114 in a management server 116 of cloud service provider 118 where the management server 116 also includes a safety check module 120, a WebSocket 122 that is part of a secure connection between a first BMC 104*a* and the management software 114, and an alternate connection between the first BMC 104*a* and the management software 114, which are described below.

Often companies that build computing equipment lease the equipment to datacenters and other customer locations close to customer facilities, sometimes called edge locations 108. Typically, the leased computing equipment is managed using a management network via management software 114 located at a cloud computing service provider 118. Other companies may purchase computing equipment and may hire another company to manage the computing equipment. In some cases, the on-site edge location 108 computing equipment may be called "edge computing" with edge servers 106. Edge computing is ideal for remote management because often on-site employees at an edge location 108 of the customer have little or no computer training and are often unable to do any maintenance on computing equipment other than very simple tasks.

A risk for edge computing is when the management software 114 is hacked by a person or organization with nefarious intent. The hacker may be able to gain access to the edge computing equipment through the management software 114. While solutions exist to manage public keys, private keys, passwords, and the like, the existing solutions are often inadequate in protecting the edge computing equipment, such as edge servers, edge switches, and the like.

A common solution for the management software 114 to communicate with an edge server 106 at an edge location 108 over a secure connection 124 through the use of a bidirectional, secure communication channel, such as a connection using a WebSocket protocol or using another competing protocol, such as a Server-Sent Events ("SSE") protocol, a Long Poling protocol, a Message Queueing Telemetry Transport ("MQTT") protocol, a Web Real-Time Communication ("WebRTC") protocol, a WebTransport protocol, or a transmission control protocol ("TCP"). The secure connection typically encrypts communications sent in either direction and provides a secure way to enable bidirectional communication. The secure connection 124 includes a WebSocket 122 in the first BMC 104*a* and on the management server 116. A danger is that if a hacker gains control of the management software 114, the hacker could gain control of the edge servers 106 at the edge location 108.

The safety check apparatus 102 on the BMCs 104, along with the safety check module 120 in the management software 114 on the management server 116 provide a way to check to see if the instance of management software 114 running on the management server 116 has been hacked by sending a request for information over the secure connection 124 as well as over an alternate connection between the BMC 104 and the safety check module 120. The safety check module 120 provides a response (a safety check response) and the management software 114 provides a response (a management software response) and the safety check apparatus 102 at the BMC 104 compares the two responses. If the responses are different, the safety check apparatus 102 sends an alert signaling a security breach. In addition, if the safety check apparatus 102 is unable to decrypt the management software response using a public key provided by the management software 114 or the safety check apparatus 102 does not receive a management software response within a time limit, the safety check apparatus 102 sends an alert signaling a security breach. The safety check apparatus 102 and the safety check module 120 are described in more detail below. While FIG. 1 describes "edge servers" 106 at an "edge" location 108, the safety check apparatus 102 and safety check module 120 may be used with other computing devices connected to management software 114 or other software over a computer network.

The edge servers 106 and, in some cases, other computing equipment at the edge location 108 such as switches, printers, etc., typically include a BMC 104. A BMC 104 typically provides a mechanism to control the edge server 106 over the management network. "BMC" is typically a generic term for a service processor in a computing device and BMCs are supplied by various computing equipment manufacturers. Examples of a BMC 104 include an Xclarity® Controller ("XCC") by Lenovo®, an Intel® AMT (Active Management Technology), or a controller with similar functionality. A BMC 104 provides a mechanism to download firmware, update software, etc. on the edge servers 106. A BMC 104 may also provide a way to start up the edge server 106 and provides a way to monitor physical parameters of the edge server 106, such as temperature, fan speed, central processing unit ("CPU") utilization, memory usage, etc. The BMC 104 typically runs various BMC services. The BMC services are typically applications running on a processor of the BMC 104 and are typically intended to allow management of the edge server 106 though the BMC 104. In some examples, a BMC service may include an application that receives and initiates a firmware update on the BMC 104. In other embodiments, the edge server 106 does not include a BMC 104 and the edge server 106 includes a WebSocket or other portion of a secure connection 124.

The edge servers 106, in some embodiments, are rack-mounted computers, which are part of a rack-mounted system. The rack-mounted system may include switches, power supplies, storage devices, and other equipment configured to be mounted in a computer rack. In other embodiments, the edge servers 106 are desktop computers, workstations, mainframe computers, or the like. The edge servers 106 are located at an edge location 108, which may be a retail store, a gas station, an office building, etc. or may be a datacenter for of a company. In other embodiments, the edge location 108 is another type of location that includes servers like the edge servers 106 described above that are managed by management software 114 at a location remote from the servers. In some embodiments, the edge servers 106 are any server that includes a BMC 104 connected via a computer network to a management server 116 with management software 114.

The cloud service provider 118 typically includes one or more physical cloud servers that are typically used to host virtual machines and/or containers running software and workloads of various clients. At least one cloud server includes a management server 116 with management software 114 for managing edge servers 106 via the BMC 104 in the edge servers 106. In some embodiments, the management software 114 is an XClarity® Administrator ("XCA") or an Xclarity® Orchestrator ("XCO"), both by Lenovo®. In some embodiments, the management server 116 is a virtual machine ("VM") hosted by the cloud service provider 118. In some instances, the VM includes an instance of an operating system running on the cloud server in the VM. In other instances, the management server 116 runs on an container. In some instances, the container does not include a separate instance of an operating system. In embodiments described herein, the management server 116 includes a safety check module 120, which is described in more detail below.

The management software 114 and/or the management server 116 include a unique user identifier ("UUID"). In some embodiments, each instance of the management software 114 includes a UUID for that instance of the management software 114. The management server 116, as used herein, denotes that VM or container running the management software 114 and may be considered the same entity and may share a UUID. The management server 116 and management software 114 are depicted separately to illustrate the addition of the safety check module 120 and the WebSocket 122 within the management server 116. In some aspects, the safety check module 120 maintains some autonomy from the management software 114 to be able to be contacted by the BMC 104 separately from the management software 114 or at least from logic of the management server 116 communicating with the BMC 104 over the secure connection 124 and/or WebSocket 122. As used herein, the BMC 104 and/or edge server 106 communicating with the management software 114 may include communicating with the management server 116 and discussion of the BMC 104 and/or edge server 106 communicating with the management software 114 is used for convenience.

Typically, the edge location 108 is separated from public networks, such as a computer network connecting the cloud service provider 118 to the edge location 108, by a firewall 110. A firewall typically runs on a router or switch and limits access to unauthorized internet protocol ("IP") addresses while allowing access to a limited number of authorized IP addresses. Where the edge location 108 is protected using a firewall, in some embodiments each edge server 106/BMC 104 has a separate IP address. In other embodiments, the edge location 108 includes a network address translation ("NAT") service 110. In such embodiments, in some cases the edge location 108 has a single IP address and each edge server 106 and/or BMC 104 includes an identifier, such as a unique user identifier ("UUID"), host name, media access control ("MAC") address, etc. and a device communicating with a particular edge server 106 (e.g., edge server 1 106*a*)

has a header with the IP address of the edge location 108 along with the identifier of the edge server 106 or other device at the edge location 108 that is the subject of the communication.

Typically, where the edge location 108 is protected with a NAT, the NAT is running on a router or similar device that includes a mapping or table with an identifier for each computing device of the edge location 108 connected to a local network of the edge location 108 so that the router is able to direct a communication to a particular computing device (for example, edge server 1 106*a*). One of skill in the art will recognize other ways of protecting computing devices of the edge location 108 using a firewall, a NAT, or a similar gateway device.

FIG. 1 depicts an alternate connection 126 between the first BMC 104*a* of the first edge server 106*a* to the safety check module 120. In some embodiments, the alternate connection 126 is a typical connection that is terminated after a query and associated response. In some embodiments, the alternate connection 126 uses transmission control protocol ("TCP"), transmission control protocol/internet protocol ("TCP/IP"), user datagram protocol ("UDP"), or other communication protocol. Such communication protocols are typically not bidirectional and expire after an exchange.

In some embodiments, a BMC 104 initiates a communication with the management server 116, for example to the safety check module 120, by encrypting a UUID of the management server 116 or management software 114 using a public key to form a passcode and transmitting data along with the passcode to the management server 116, which decrypts the passcode using a private key that is paired with the public key. If the decryption is successful, the management server 116 authorizes the communication and allows the data or message to be used by the management server 116. Typically, the management server 116 then provides a response to the query, which may be encrypted using the private key and the BMC 104 decrypts the response using the public key. The alternate connection 126 may then be terminated and is typically not maintained long-term. In other embodiments, the alternate connection 126 is bidirectional, secure connection different than the secure connection 124 connecting the management software 114 with the BMC 104.

Circled numbers in FIG. 1 depict a flow pertaining the embodiments described herein. The circled number 1 indicates that the BMC 104 initiates communication with the management software 114. Typically, because of the firewall/NAT 110, the management software 114/management server 116 is unable to initiate communication with the BMC 104/edge server 106. After the BMC 104 initiates communication with the management software 114, circled number 2 indicates that the management software 114 sets up the bidirectional secure connection 124 with a WebSocket 122 or similar protocol and transmits the UUID of the instance of the management software 114 and a public key to the BMC 104. While the secure connection 124 is shown connected to the first BMC 104*a*, other embodiments may include another BMC (e.g., 104*b*-104*n*) connecting via a secure connection 124 with the management software 114.

At some point after the secure connection 124 is established, circled number 3 indicates that the BMC 104 selects a request for information, which is transmitted to the safety check module 120 via the alternate connection 126. The safety check module 120 responds by transmitting a response (e.g., a safety check response) to the BMC 104. The safety check response is a response to the request for information transmitted by the BMC 104. In some embodiments, the request for information is in the form of an application programming interface ("API") call to the safety check module 120 and includes a header with information indicating that the API call is directed to the safety check module 120. The request for information from the BMC 104 to the safety check module 120 includes the UUID encrypted by the public key as a passcode and the safety check module 120 decrypts the UUID and/or the request for information using a private key that corresponds to the public key.

Circled number 4 indicates that the BMC 104 sends the same request for information to the management software 114 via the secure connection 124/WebSocket 122. The management software 114 responds to the request for information by transmitting a response (e.g., a management software response) to the BMC 104 via the secure connection 124/WebSocket 122. Typically, the management software response is encrypted using the private key and the BMC 104 uses the public key to decrypt the response. In some embodiments, the request for information sent to the management software 114 is an API call directed to the management software 114. The BMC 104 compares the safety check response and the management software response and if the responses differ, the BMC 104 sends an alert. Also, if the BMC 104 is unable to decrypt the management software response using the public key, the BMC 104 sends an alert. In some embodiments, if the BMC 104 does not receive a management software response within a time limit after sending the request for information to the management software 114, the BMC 104 sends an alert.

The circled number 5 indicates that at some point the management software 114 and/or the management server 116 may be hacked. Where the management software 114 and/or the management server 116 are hacked, the management software 114 may be unable to send a management software response that matches the safety check response. The actions of the BMC 104 described above with respect to the circled numbers, in some embodiments are carried out using the safety check apparatus 102.

Figure 2:
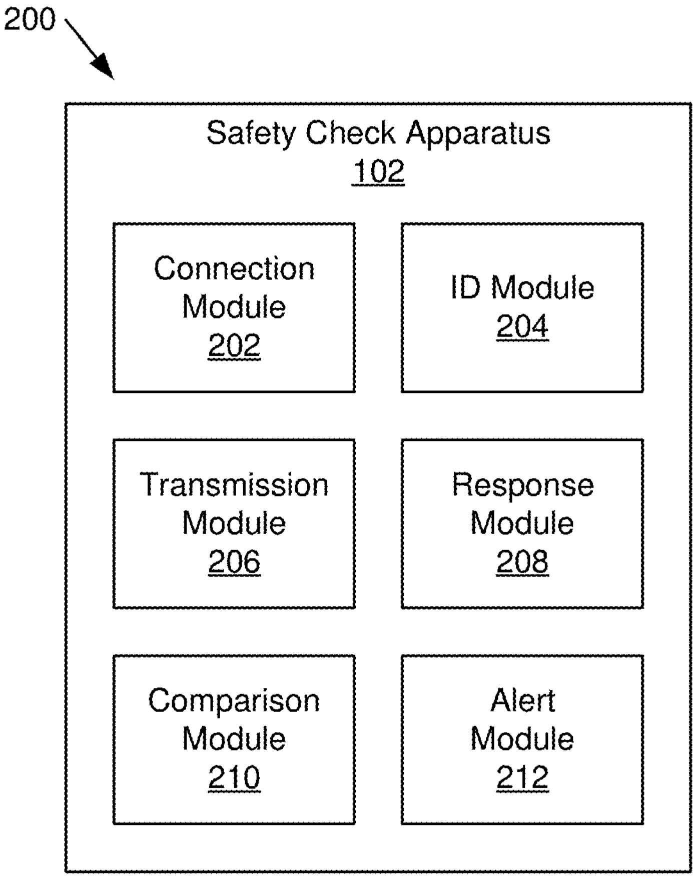
FIG. 2 is a schematic block diagram illustrating an apparatus for an edge system/cloud reverse security check, according to various embodiments.

FIG. 2 is a schematic block diagram illustrating an apparatus 200 for an edge system/cloud reverse security check, according to various embodiments. The apparatus 200 includes a safety check apparatus 102 that includes a connection module 202, an identification ("ID") module 204, a transmission module 206, a response module 208, a comparison module 210, and an alert module 212, which are described in more detail below. In some embodiments, the apparatus is implemented using code stored on a computer readable storage media, which is non-transitory. The computer readable storage media may include non-volatile storage media in the BMC 104 and may also include memory in the BMC 104. In other embodiments, the apparatus 200 is stored in another location accessible to the BMC 104. In some embodiments, all or a portion of the apparatus 200 is implemented using a programmable hardware device. In some embodiments, a portion of the apparatus 200 is implemented using hardware circuits, such as a port for connecting to the management server 116, circuits for transmitting and receiving data, or the like.

The apparatus 200 includes a connection module 202 configured to establish a secure connection 124 between a BMC 104 of an edge server 106 at an edge location 108 and management software 114 of a management server 116 running on a cloud server. The cloud server is hosted by a cloud service provider 118. The management software 114, in some embodiments, manages the edge server 106 through the BMC 104. The secure connection 124 is bidirectional. As discussed above, the secure connection 124 may use a WebSocket protocol, a WebTransport protocol, a SSE protocol, a Long Poling protocol, a MQTT protocol, TCP, or the like. In some embodiments, the connection module 202 establishes the secure connection 124 by initiating communication with the management server 116 and/or the management software 114 and the management software 114 and/or management server 116 sets up or participates in setting up the secure connection 124.

The apparatus 200 includes an ID module 204 configured to receive a UUID of the management software 114 and a public key from the management software 114. The public key corresponds to a private key at the management server 116. In some embodiments, the management server 116 generates the public key and the private key for the particular BMC (e.g., 104*a*) being connected. In some embodiments, each instance of the management software 114 has a different UUID. In other embodiments, the management server 116 and the management software 114 share a UUID where the UUID is for a VM or container running the management software 114 and other functions of the management server 116. One of skill in the art will recognize other implementations of a UUID to be shared with the BMC 104 and other ways to generate and manage a public key and associated private key.

The apparatus 200 includes a transmission module 206 configured to transmit, from the BMC 104 to a safety check module 120 located in the management software 114 on the management server 116, a request for information and to transmit, over the secure connection 124, the same request for information to the management software 114. The safety check module 120 is within the management software 114 but separate from typical logic of the management software 114 to provide some separation from logic that may be hacked. The transmission module 206 transmits the request for information to the safety check module 120 over an alternate connection 126 separate from the secure connection 124. As discussed above, the alternate connection 126, in some embodiments, is not a persistent connection and/or is not a bidirectional connection. In other embodiments, the alternate connection 126 is separate from the secure connection 124, but is also bidirectional and secure using a WebSocket protocol or similar protocol. In some embodiments, the transmission module 206 transmits the UUID that is encrypted using the public key as a passcode along with the request for information to the safety check module 120.

The apparatus 200 includes a response module 208 configured to receive a safety check response from the safety check module 120 and a management software response from the management software 114. In some embodiments, the response module 208 receives the safety check response over the alternate connection 126 and receives the management software response over the secure connection 124. Both responses are intended to be for the same request for information. Having the safety check module 120 depicted as an independent module within the management software 114 is intended to show separation from logic or code of the management software 114 is intended to provide separation so that a hacker that accesses the management software 114 would not access the safety check module 120.

The requests for information are structured to be paired with unique or non-trivial responses that a hacker would not know or have access to. In some embodiments, the requests for information are for some information that was correlated when the secure connection 124 was established. In other embodiments, the requests for information are available from the safety check module 120 to both the BMC 104 and to the management software 114. Where the management software 114 retrieves a response from the safety check module 120, the responses may be provided to the management software 114 after the management software 114 presents a keyword, password, etc. In some embodiments, the responses are encrypted with a key different than the public key and the private key where a hacker may not have the key.

In some embodiments, the safety check module 120 and the BMC 104 each have a list of requests for information and corresponding responses where the responses are random with respect to the requests. For example, a request may be simply "query 1" and the response may be "blue," another may be "query 2" and the response may be "apple," and so forth so that the responses are not connected and cannot be easily derived from other responses. Thus, a hacker would not know how to respond to a request for information without having prior knowledge of the assigned responses to various queries. One of skill in the art will recognize other ways to structure requests for information and associated responses so that during normal operation the management software 114 provides a same response as the safety check module 120 but a hacker would not know how to respond to the same request for information.

The apparatus 200 includes a comparison module 210 configured to compare the safety check response and the management software response and an alert module 212 configured to send an alert signaling a security breach at the management software in response to the safety check response differing from the management software response. Where the comparison module 210 determines that the responses differ, the alert module 212 sends an alert. The alert, in some embodiments, is sent to a system administrator, a person at the edge location 108, or the like. In some embodiments, the alert is sent to the BMC 104 which is able to take action, such as terminating the secure connection 124. In some embodiments, the alert module 212 transmits the alert over a channel separate from the secure connection 124 and the alternate connection 126 to avoid having the hacker knowing that the alert has been sent.

In some embodiments, the alert module 212 transmits an alert signaling a security breach in response to the response module 208 determining that the BMC 104 has not received a management software response or not being able to decrypt the management software response using the public key. In cases when the management software 114 and/or management server 116 is hacked, the hacker may not be able to property encrypt transmissions to the BMC 104 or may not be able to identify a correct response to the request for information within a time limit for sending the management software response to the BMC 104. In some embodiments, the alert module 212 is able to distinguish between not receiving a management software response within a time limit from when a request for information was sent to the management software 114 and a general loss of connection to the management software 114.

Figure 3:
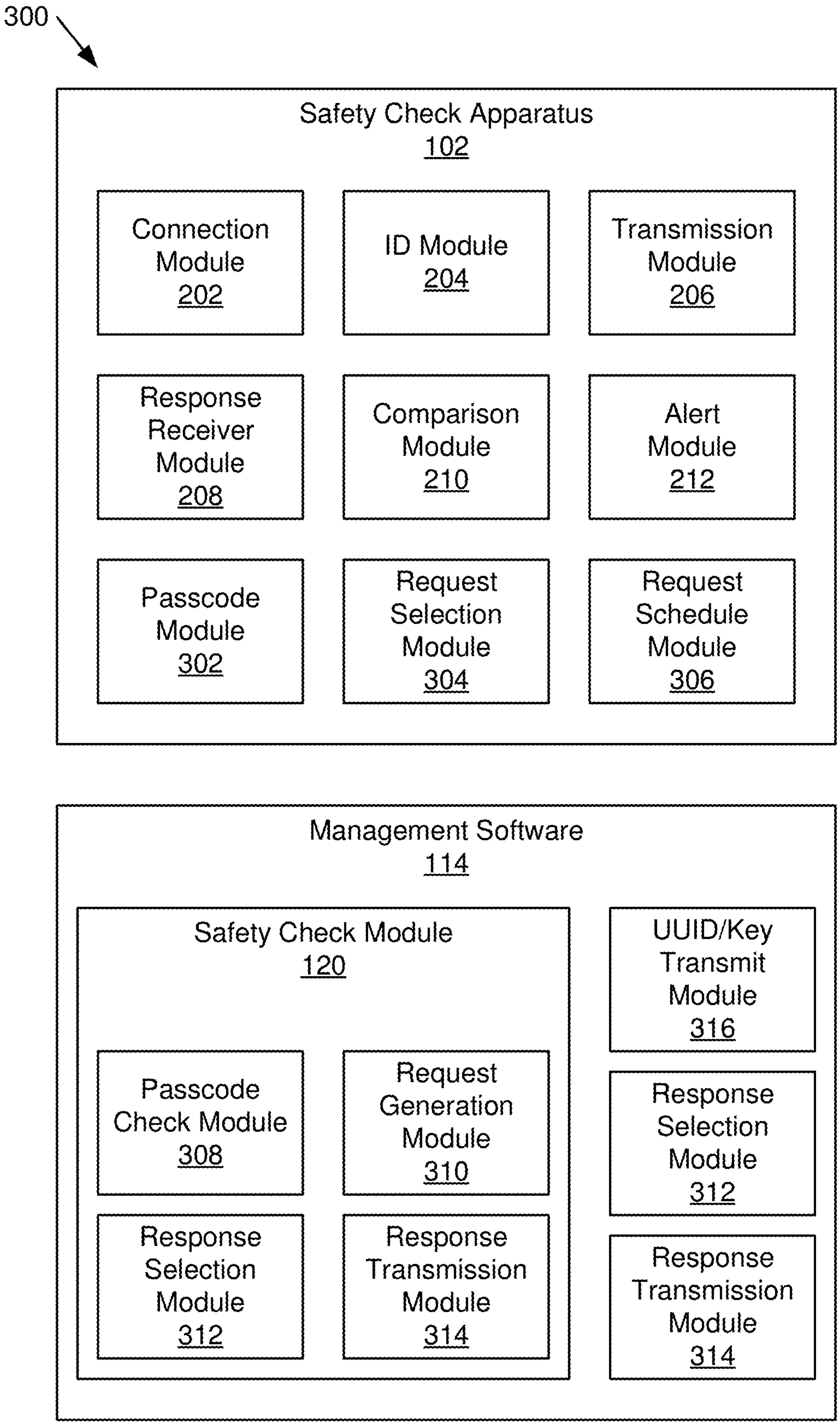
FIG. 3 is a schematic block diagram illustrating another apparatus for an edge system/cloud reverse security check, according to various embodiments.

FIG. 3 is a schematic block diagram illustrating another apparatus 300 for an edge system/cloud reverse security check, according to various embodiments. The apparatus 300 includes another safety check apparatus 102 with a safety check apparatus 102 that includes a connection module 202, an ID module 204, a transmission module 206, a response module 208, a comparison module 210, and an alert module 212, which are substantially similar to those described above in relation to the apparatus 200 of FIG. 2. In various embodiments, the safety check apparatus 102 includes a passcode module 302, a request selection module 304, and a request schedule module 306 and the apparatus 300 includes management software 114 with a safety check module 120 with a passcode check module 308, a request generation module 310, a response selection module 312, and a response transmission module 314 and the management software 114 also includes a UUID/Key transmit module 316, a response selection module 312, and a response transmission module 314, which are described below. In various embodiments, the apparatus 300 is implemented similar to the apparatus 200 of FIG. 2.

In some embodiments, the safety check apparatus 102 includes a passcode module 302 configured to encrypt the UUID and to transmit the encrypted UUID as a passcode to the safety check module 120 along with the request for information and the safety check module 120 includes a passcode check module 308 configured to decrypt the UUID using a private key corresponding to the public key. Where the passcode check module 308 is unable to decrypt the passcode using the private key or where the UUID does not match the UUID of the management software 114 and/or the management server 116, the safety check module 120 does not respond to the request for information. In some embodiments, the safety check module 120 responds to not being able to decrypt the passcode or the UUID not being a match by sending an alert.

In some embodiments, the safety check apparatus 102 includes a request selection module 304 configured to select a request for information from a pool of requests for information. In some embodiments, the request selection module 304 is configured to randomly select a request for information from the pool of requests for information. In other embodiments, the request selection module 304 selects a request for information by rotating through the pool of requests for information according to a particular pattern or sequence.

In some embodiments, the safety check apparatus 102 includes a request schedule module 306 configured to trigger the request selection module 304 to select a request for information and for the transmission module 206 to send the request for information to the safety check module 120 and to the management software 114. In some embodiments, request schedule module 306 uses a timer and upon expiration of the timer the request schedule module 306 triggers selection and transmission of a request for information. For example, the timer may be set to 10 minutes, 30 minutes, etc. In other embodiments, the request schedule module 306 has a schedule and a clock and triggers selection and transmission of a request for information at times listed on the schedule. In some embodiments, the request schedule module 306 includes a user interface to allow a user to set a timer, input a schedule, etc.

In some embodiments, the safety check module 120 includes a request generation module 310 configured to generate a pool of requests for information corresponding responses and transmits the pool of requests for information to the BMC 104 in response to establishment of the secure connection 124 between the management software 114/management server 116 and the BMC 104. In other embodiments, the request generation module 310 receives requests for information and associated responses from a user or other location. One of skill in the art will recognize other ways for the request generation module 310 to generate, receive, retrieve, etc. requests for information and associated responses.

In some embodiments, the request generation module 310 transmits the requests for information from the pool to the BMC 104, for example, as part of an initial setup of the secure connection and safety check module 120. In the embodiments, the request generation module 310 provides the requests for information from the pool to the BMC 104 so that later during a safety check the BMC 104 has the pool of requests for information when selecting a request for information. In other embodiments, the BMC 104 gets the pool of requests for information from another source. In some embodiments, the request generation module 310 transmits the requests for information from the pool via the secure connection 124, due to the firewall/NAT 110 not allowing unsolicited incoming transmissions other than the bidirectional secure connection 124. In some cases, the request generation module 310 transmits the pool of requests and responses directly to the BMC 104 via the secure connection. In other embodiments, the request generation module 310 transmits the pool of requests for information and responses via the management software 114 or management server 116.

In some embodiments, the safety check module 120 includes a response selection module 312 configured to select a safety check response that is in response to the safety check module 120 receiving a request for information from the safety check apparatus 102 of the BMC 104. The response selection module 312 is configured to provide a correct response to the request for information. In some embodiments, the response selection module 312 accesses a table, a list, etc. that includes responses correlated to requests for information and uses the received request for information to access a corresponding response. In other embodiments, the response selection module 312 accesses a website, a database, or the like to retrieve a response correlated to the request for information. In other embodiments, the response selection module 312 accesses a website or other resource accessible via a computer network to retrieve a response that correlates with the request for information. One of skill in the art will recognize other ways for the response selection module 312 to generate a response to a received request for information.

The safety check module 120 includes, in some embodiments, a response transmission module 314 configured to transmit the safety check response selected by the response selection module 312 to the BMC 104 over the alternate connection 126. In some embodiments, the response selection module 312 or the response transmission module 314 encrypts the safety check response using the private key prior to transmitting the safety check response to the BMC 104. The BMC 104 then uses the public key to decrypt the safety check response.

In some embodiments, the management software 114 includes a UUID/key transmit module 316 configured to transmit the UUID of the management software 114 and/or the management server 116 and a public key to the BMC 104 in response to the BMC 104 seeking to establish a secure connection with the management software 114/management server 116. The public key corresponds to a private key held at the management server 116 and/or management software 114. In some embodiments, the UUID/key transmit module 316 generates a public key and a corresponding private key in response to the request from the BMC 104 to establish a secure connection. In other embodiments, the UUID/key transmit module 316 retrieves or receives a public key and corresponding private key generated elsewhere in response to the request from the BMC 104 to establish a secure connection and/or prior to transmitting the UUID and public key to the BMC 104.

In some embodiments, the management software 114 includes a response selection module 312 similar to the response selection module 312 of the safety check module 120. In other embodiments, the management software 114 and the safety check module 120 use the same response selection module 312. The response selection module 312 in the management software 114 or working on behalf of the management software 114 selects a response to the request for information received over the secure connection 124 from the safety check apparatus 102 and/or the BMC 104. In some embodiments, the response selection module 312 accesses a table, list, etc. to retrieve a correct response. In other embodiments, the response selection module 312 contacts the safety check module 120 to receive a response to the request for information. In the embodiments, the response selection module 312 transmits the request for information to the safety check module 120. In other embodiments, the response selection module 312 uses a password, an encryption key, a hash, or other method to access and/or decrypt a response that corresponds to the request for information. The response selection module 312 uses a method to select a response to the request for information that a hacker would not be able to do.

In some embodiments, the management software 114 includes a response transmission module 314 similar to the response transmission module 314 of the safety check module 120. In other embodiments, the management software 114 and the safety check module 120 use the same response transmission module 314. The response transmission module 314 of the management software 114 or working on behalf of the management software 114 transmits the response (e.g., management software response) via the secure connection 124 to the BMC 104. In some embodiments, the response transmission module 314 encrypts the management software response using the private key prior to transmission to the BMC 104.

Figure 4:
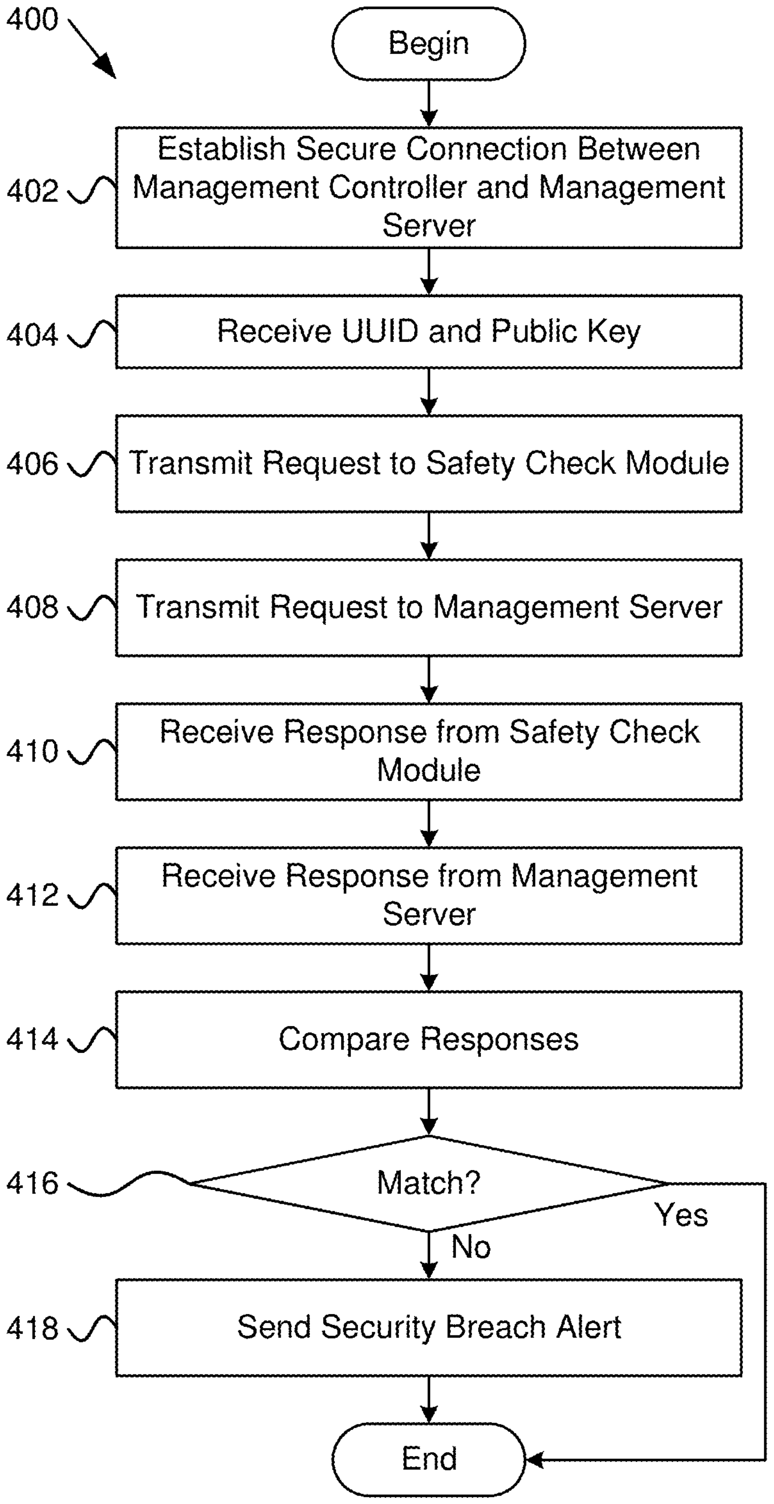
FIG. 4 is a schematic flow chart diagram illustrating a method for an edge system/cloud reverse security check, according to various embodiments.

FIG. 4 is a schematic flow chart diagram illustrating a method 400 for an edge system/cloud reverse security check, according to various embodiments. The method 400 begins and establishes 402 a secure connection 124 between a BMC 104 of an edge server 106 at an edge location 108 and management software 114 of a management server 116 running on a cloud server. The management software 114 manages the edge server 106 through the BMC 104. The secure connection 124 is bidirectional. The method 400 receives 404 a UUID of the management software 114 and a public key from the management software 114. The public key corresponds to a private key at the management server 116.

The method 400 transmits 406, from the BMC 104 to a safety check module 120 located on the management server 116, a request for information and transmits 408, over the secure connection 124, the same request for information to the management software 114. The method 400 receives 410 a safety check response from the safety check module 120 and receives 412 a management software response from the management software 114 and compares 414 the safety check response and the management software response. The method 400 determines 416 if the management software response matches the safety check response.

If the method 400 determines 416 that the management software response matches the safety check response, the method 400 ends. If the method 400 determines 416 that the management software response does not match the safety check response, the method 400 sends 418 an alert signaling a security breach at the management software, and the method 400 ends. In various embodiments, the method 400 is implemented using all or a portion of the connection module 202, the ID module 204, the transmission module 206, the response module 208, the comparison module 210, and/or the alert module 212.

Figure 5:
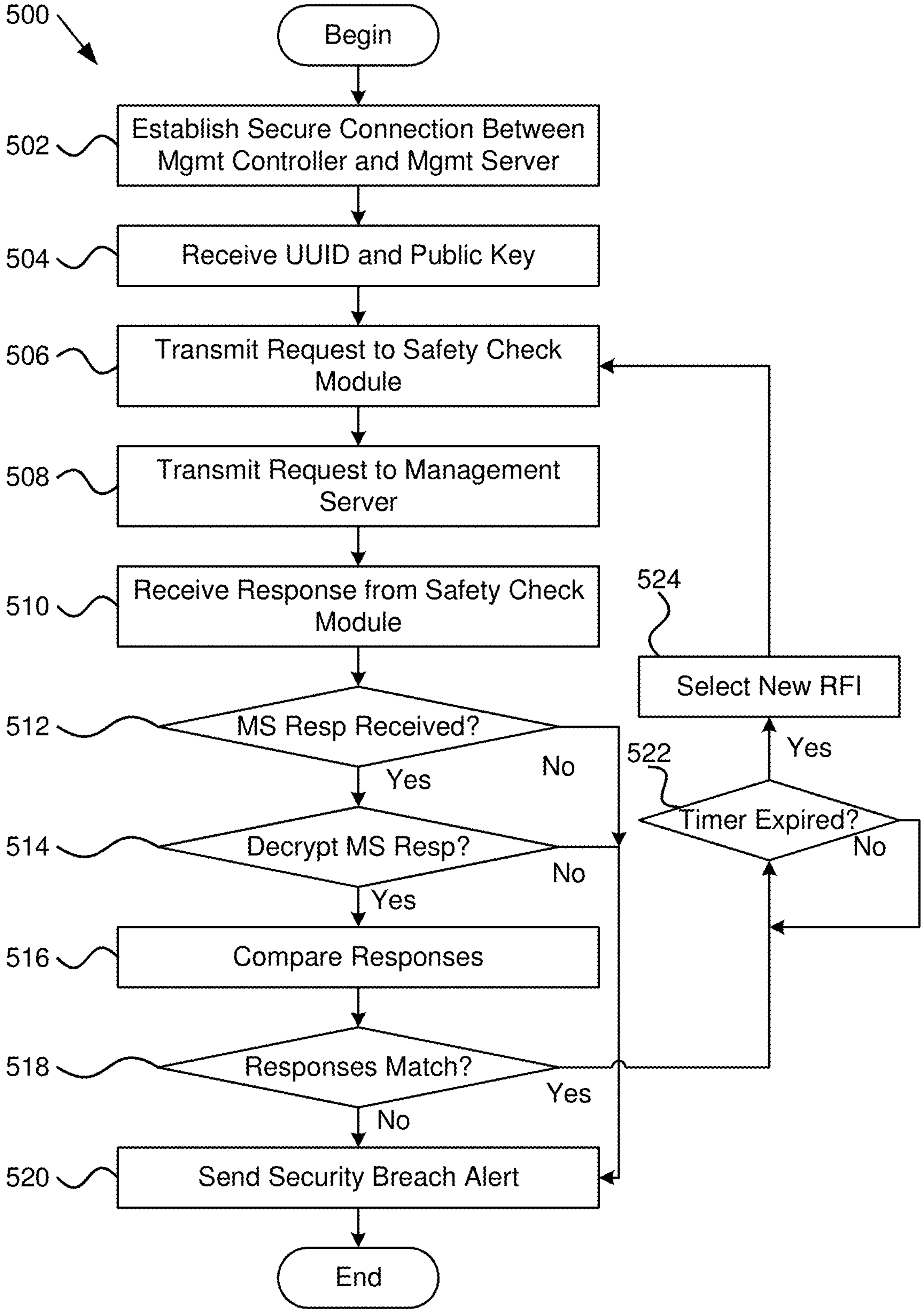
FIG. 5 is a schematic flow chart diagram illustrating another method for an edge system/cloud reverse security check, according to various embodiments.

FIG. 5 is a schematic flow chart diagram illustrating another method 500 for an edge system/cloud reverse security check, according to various embodiments. The method 500 begins and establishes 502 a secure connection 124 between a BMC 104 of an edge server 106 at an edge location 108 and management software 114 of a management server 116 running on a cloud server. The management software 114 manages the edge server 106 through the BMC 104. The secure connection 124 is bidirectional. The method 500 receives 504 a UUID of the management software 114 and a public key from the management software 114. The public key corresponds to a private key at the management server 116.

The method 500 transmits 506, from the BMC 104 to a safety check module 120 located on the management server 116, a request for information and transmits 508, over the secure connection 124, the same request for information to the management software 114. The method 500 receives 510 a safety check response from the safety check module 120 and determines 512 if the BMC 104 has received a management software response from the management software 114. If the method 500 determines 512 that the BMC 104 has received a management software response, the method 500 determines 514 if the management software response can be decrypted using the public key. If the method 500 determines 514 that the management software response can be decrypted using the public key, the method 500 compares 516 the safety check response and the management software response. The method 500 determines 518 if the management software response matches the safety check response.

If the method 500 determines 518 that the management software response does not match the safety check response, the method 500 sends 520 an alert signaling a security breach at the management software, and the method 500 ends. If the method 500 determines 518 that the management software response matches the safety check response, the method 500 determines 522 if a timer has expired. If the method 500 determines 522 that the timer has not expired, the method 500 returns and continues to determine 522 if the timer has expired. If the method 500 determines 522 that the timer has expired, the method 500 selects 524 a new request for information and returns and transmits 506 the new request for information to the safety check module 120 via the alternate connection 126 and transmits the new request for information to the management software 114 via the secure connection 124.

If the method 500 determines 512 that the BMC 104 has not received a management software response or if the method 500 determines 514 that the response from the management software 114 cannot be decrypted using the public key, the method 500 sends 520 an alert signaling a security breach, and the method 500 ends. In various embodiments, the method 500 is implemented using all or a portion of the connection module 202, the ID module 204, the transmission module 206, the response module 208, the comparison module 210, the alert module 212, the passcode module 302, the request selection module 304, the request schedule module 306, the passcode check module 308, the request generation module 310, the response selection module 312, the response transmission module 314 and/or the UUID/Key transmit module 316.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

establishing a secure connection between a baseboard management controller ("BMC") of an edge server at an edge location and management software of a management server running on a cloud server, the management software managing the edge server through the BMC, wherein the secure connection is bidirectional;

receiving a unique user identifier ("UUID") of the management software and a public key from the management software, the public key corresponding to a private key at the management server;

transmitting, from the BMC to a safety check module located on the management server, a request for information;

transmitting, over the secure connection, the same request for information to the management software;

receiving a safety check response from the safety check module and a management software response from the management software;

comparing the safety check response and the management software response; and sending an alert signaling a security breach at the management software in response to the safety check response differing from the management software response.

2. The method of claim 1, wherein the management software encrypts the management software response using a private key corresponding to the public key and further comprising sending an alert in response to one of the BMC being unable to decrypt the management software response using the public key and the BMC not receiving a management software response within a time limit.

3. The method of claim 1, wherein the request for information is one of a pool of requests for information, and further comprising randomly selecting a request for information from the pool of requests for information.

4. The method of claim 3, wherein each request for information in the pool of requests for information comprises a unique response known to the safety check module and to the management software.

5. The method of claim 3, wherein the BMC periodically selects a request for information from the pool of requests for information and transmits the selected request for information to the safety check module and to the management software.

6. The method of claim 1, wherein transmitting the request for information to the safety check module is over an alternate connection separate from the secure connection and wherein the BMC receives the safety check response over the alternate connection.

7. The method of claim 6, wherein the BMC communicates over the alternate connection with the safety check module by encrypting the UUID and transmitting the encrypted UUID as a passcode along with the request for information to the safety check module, wherein the safety check module decrypts the UUID using a private key corresponding to the public key, and/or wherein the safety check module encrypts the safety check response using the private key prior to transmitting the safety check response to the BMC, wherein the BMC uses the public key to decrypt the safety check response.

8. The method of claim 6, wherein the alternate connection expires in response to the safety check module transmitting the safety check response.

9. The method of claim 1, wherein the secure connection uses one of a WebSocket protocol, a Server-Sent Events ("SSE") protocol, a Long Poling protocol, a Message Queueing Telemetry Transport ("MQTT") protocol, a Web Real-Time Communication ("WebRTC") protocol, a WebTransport protocol, and a transmission control protocol ("TCP").

10. The method of claim 1, wherein:

communication between the management server and the BMC is across one of a firewall and a network address translation ("NAT") service; and/or the request for information comprises an application programming interface ("API") call.

11. An apparatus comprising:

a processor in a baseboard management controller ("BMC") of an edge server at an edge location; and non-transitory computer readable storage media storing code, the code being executable by the processor to perform operations comprising:

establishing a secure connection between the BMC and management software of a management server running on a cloud server, the management software managing the edge server through the BMC, wherein the secure connection is bidirectional;

receiving a unique user identifier ("UUID") of the management software and a public key from the management software, the public key corresponding to a private key at the management server;

transmitting, from the BMC to a safety check module located on the management server, a request for information;

transmitting, over the secure connection, the same request for information to the management software;

receiving a safety check response from the safety check module and a management software response from the management software;

comparing the safety check response and the management software response; and sending an alert signaling a security breach at the management software in response to the safety check response differing from the management software response.

12. The apparatus of claim 11, wherein the management software encrypts the management software response using a private key corresponding to the public key and further comprising sending an alert in response to one of the BMC being unable to decrypt the management software response using the public key and the BMC not receiving a management software response within a time limit.

13. The apparatus of claim 11, wherein the request for information is one of a pool of requests for information, and further comprising randomly selecting a request for information from the pool of requests for information.

14. The apparatus of claim 13, wherein each request for information in the pool of requests for information comprises a unique response known to the safety check module and to the management software.

15. The apparatus of claim 13, wherein the BMC periodically selects a request for information from the pool of requests for information and transmits the selected request for information to the safety check module and to the management software.

16. The apparatus of claim 11, wherein transmitting the request for information to the safety check module is over an alternate connection separate from the secure connection and wherein the BMC receives the safety check response over the alternate connection.

17. The apparatus of claim 16, wherein the BMC communicates over the alternate connection with the safety check module by encrypting the UUID and transmitting the encrypted UUID as a passcode to the safety check module, wherein the safety check module decrypts the UUID using a private key corresponding to the public key, and wherein the safety check module encrypts the safety check response using the private key prior to transmitting the safety check response to the BMC, wherein the BMC uses the public key to decrypt the safety check response; and/or the alternate connection expires in response to the safety check module transmitting the safety check response.

18. The apparatus of claim 11, wherein the secure connection uses one of a WebSocket protocol, a Server-Sent Events ("SSE") protocol, a Long Poling protocol, a Message Queueing Telemetry Transport ("MQTT") protocol, a Web Real-Time Communication ("WebRTC") protocol, a WebTransport protocol, and a transmission control protocol ("TCP").

19. The apparatus of claim 11, wherein:

communication between the management server and the BMC is across one of a firewall and a network address translation ("NAT") service; and/or the request for information comprises an application programming interface ("API") call.

20. A program product comprising a non-transitory computer readable storage medium storing code, the code being configured to be executable by a processor to perform operations comprising:

establishing a secure connection between a baseboard management controller ("BMC") of an edge server at an edge location and management software of a management server running on a cloud server, the management software managing the edge server through the BMC, wherein the secure connection is bidirectional;

receiving a unique user identifier ("UUID") of the management software and a public key from the management software, the public key corresponding to a private key at the management server;

transmitting, from the BMC to a safety check module located on the management server, a request for information;

transmitting, over the secure connection, the same request for information to the management software;

receiving a safety check response from the safety check module and a management software response from the management software; and comparing the safety check response and the management software response; and sending an alert signaling a security breach at the management software in response to the safety check response differing from the management software response.

* * * * *